United States Patent
Stockwell et al.

(10) Patent No.: US 10,634,865 B2
(45) Date of Patent: Apr. 28, 2020

(54) SIGHT GLASS APPARATUS

(71) Applicant: Process Vision Ltd., Basingstoke (GB)

(72) Inventors: Paul Stockwell, Guiseley (GB); David Widdup, Guiseley (GB); Jon Raynes, Guiseley (GB)

(73) Assignee: Process Vision Ltd., Basingstoke, Hampshire (GB)

( * ) Notice: Subject to any disclaimer, the term of this patent is extended or adjusted under 35 U.S.C. 154(b) by 316 days.

(21) Appl. No.: 15/319,871

(22) PCT Filed: Jun. 23, 2015

(86) PCT No.: PCT/GB2015/051833
§ 371 (c)(1),
(2) Date: Dec. 19, 2016

(87) PCT Pub. No.: WO2015/198038
PCT Pub. Date: Dec. 30, 2015

(65) Prior Publication Data
US 2017/0139170 A1    May 18, 2017

(30) Foreign Application Priority Data
Jun. 25, 2014 (GB) .................................. 1411258.5

(51) Int. Cl.
*G02B 7/00* (2006.01)
*B01J 3/00* (2006.01)
*G01D 11/26* (2006.01)

(52) U.S. Cl.
CPC .............. *G02B 7/007* (2013.01); *B01J 3/004* (2013.01); *G01D 11/26* (2013.01)

(58) Field of Classification Search
CPC ................................. B01J 4/004; G02B 7/007
See application file for complete search history.

(56) References Cited

U.S. PATENT DOCUMENTS

| 2,758,719 | A | * | 8/1956 | Line | F25B 43/003 |
|||||| 210/239 |
| 2,942,469 | A | * | 6/1960 | Roy | G01F 23/02 |
|||||| 73/334 |

(Continued)

FOREIGN PATENT DOCUMENTS

| CN | 1026614 C | 11/1994 |
| EP | 0501049 A1 | 9/1992 |

(Continued)

OTHER PUBLICATIONS

Combined Search and Examination Report under Sections 17 & 18(3) dated Dec. 22, 2014 received in counterpart GB Application No. 1411258.5, 4 pgs.

(Continued)

*Primary Examiner* — John Fitzgerald
(74) *Attorney, Agent, or Firm* — Shumaker & Sieffert, P.A.

(57) ABSTRACT

A sight glass apparatus for viewing the interior of a pressurised vessel, chamber or a pipe conveying fluid under pressure is described. The sight glass apparatus comprises a sight glass assembly mounted over an opening into the vessel, chamber or pipe, the sight glass assembly comprising a sight glass adjacent the opening which provides a window to the inside of the vessel, chamber or pipe, and a containment vessel mounted behind and/or around the sight glass assembly for containing fluid exiting the opening in the pipe in the event that the sight glass assembly fails. In this way, even if the sight glass assembly fails, the pressurised fluid within the pressurised vessel, chamber or pipe is safely contained. In addition, a secondary sight glass can be provided behind the first, with a liquid or gel, or minimal gap, between the primary and secondary glasses to reduce the likelihood of a failure in the first sight glass triggering (Continued)

failure of the second sight glass, and/or a valve can be provided to automatically isolate the pressure system upon a sight glass failure.

38 Claims, 9 Drawing Sheets

(56) References Cited

U.S. PATENT DOCUMENTS

| | | | | |
|---|---|---|---|---|
| 3,014,981 A * | 12/1961 | Appl | F16J 15/02 | 116/276 |
| 3,148,543 A * | 9/1964 | Roy | B01J 3/004 | 359/894 |
| 3,335,607 A * | 8/1967 | Seekins | G01F 23/292 | 359/894 |
| 3,345,872 A * | 10/1967 | Meginnis | F16J 15/184 | 359/894 |
| 3,407,662 A * | 10/1968 | Tarbox | G01F 23/02 | 116/276 |
| 3,438,540 A * | 4/1969 | Roy | B01J 3/004 | 220/377 |
| 3,517,554 A * | 6/1970 | Smith | G01F 23/02 | 137/559 |
| 3,556,038 A * | 1/1971 | Wolfe | G02B 7/007 | 114/173 |
| 3,625,390 A * | 12/1971 | Meginnis | B01J 3/004 | 220/328 |
| 3,657,057 A * | 4/1972 | Shorr | B32B 17/10064 | 428/412 |
| 3,672,749 A * | 6/1972 | Roser | G02B 23/2476 | 116/276 |
| 3,746,431 A * | 7/1973 | Meginnis | F16J 15/02 | 359/827 |
| 3,782,809 A * | 1/1974 | Shropshire | G02B 7/007 | 122/6.5 |
| 3,837,226 A * | 9/1974 | Kawawa | B01J 3/004 | 220/663 |
| 3,899,243 A * | 8/1975 | Haverkamp | B01J 3/004 | 359/503 |
| 3,941,460 A * | 3/1976 | Meginnis | G02B 7/007 | 359/894 |
| 3,942,881 A * | 3/1976 | Meginnis | G02B 7/007 | 359/894 |
| 3,951,301 A * | 4/1976 | Meginnis | B65D 90/00 | 220/328 |
| 3,957,359 A * | 5/1976 | Meginnis | G02B 7/007 | 359/894 |
| 3,974,933 A * | 8/1976 | Toth | E05B 65/006 | 220/3.8 |
| 3,977,251 A * | 8/1976 | Meginnis | G01F 23/02 | 73/334 |
| 4,117,860 A * | 10/1978 | Carlin | A62C 33/00 | 137/513.5 |
| 4,162,826 A * | 7/1979 | Van der Beck | G02B 7/007 | 351/154 |
| 4,169,309 A * | 10/1979 | Meginnis | B23P 11/025 | 220/663 |
| 4,182,179 A * | 1/1980 | Meginnis | G01F 23/02 | 220/663 |
| 4,206,537 A * | 6/1980 | Meginnis | B23P 11/025 | 220/663 |
| 4,245,749 A * | 1/1981 | Graves | F16K 17/16 | 116/276 |
| 4,301,833 A * | 11/1981 | Donald, III | F16K 17/28 | 137/521 |
| 4,372,652 A * | 2/1983 | Pontefract | B01J 3/004 | 359/819 |
| 4,468,095 A * | 8/1984 | Meginnis | G02B 7/007 | 359/819 |
| 4,809,862 A * | 3/1989 | Canty | B01J 3/004 | 116/276 |
| 4,877,668 A * | 10/1989 | Hinz | C03C 17/23 | 428/68 |
| 4,893,912 A | 1/1990 | Koehnen et al. | | |
| 5,000,580 A * | 3/1991 | Leininger | G01J 5/0014 | 356/44 |
| 5,072,595 A * | 12/1991 | Barbier | F25B 41/006 | 250/577 |
| 5,082,635 A * | 1/1992 | Wakatsuki | G01N 21/0317 | 117/200 |
| 5,103,648 A * | 4/1992 | Barbier | G01F 23/2925 | 62/126 |
| 5,125,269 A * | 6/1992 | Horst, Jr. | G01F 23/02 | 116/276 |
| 5,210,658 A * | 5/1993 | Foster | G02B 7/007 | 359/894 |
| 5,343,826 A * | 9/1994 | Brown | G01F 1/06 | 116/273 |
| 5,442,959 A * | 8/1995 | Mills | G01F 23/02 | 73/326 |
| 5,821,428 A * | 10/1998 | Taggart | B01J 3/004 | 73/861.56 |
| 5,832,973 A * | 11/1998 | Goldschmidt | C12M 29/00 | 141/383 |
| 6,213,142 B1 * | 4/2001 | Engdahl | F16K 17/366 | 137/38 |
| 6,499,439 B1 * | 12/2002 | Kohler | F23M 11/042 | 122/19.2 |
| 6,578,418 B2 * | 6/2003 | Dillon | G01F 23/2922 | 73/293 |
| RE38,220 E * | 8/2003 | Engdahl | F16K 17/366 | 137/38 |
| 7,540,187 B1 * | 6/2009 | Dillon | G01F 23/02 | 73/323 |
| 7,654,219 B2 * | 2/2010 | Armstrong | F16J 12/00 | 116/276 |
| 7,828,011 B2 * | 11/2010 | Huet | F16K 15/033 | 137/521 |
| 9,032,805 B2 * | 5/2015 | Wakeman | G01L 19/10 | 116/273 |
| 9,453,612 B2 * | 9/2016 | Park | F16K 17/04 | |
| 2002/0189686 A1 * | 12/2002 | Geisinger | F16K 1/22 | 137/521 |
| 2003/0184746 A1 | 10/2003 | Johnsen et al. | | |
| 2006/0075784 A1 * | 4/2006 | Mersmann | F27B 14/061 | 65/158 |
| 2009/0000666 A1 * | 1/2009 | Peyton | E03B 9/16 | 137/15.17 |
| 2013/0305832 A1 * | 11/2013 | Wakeman | G01L 19/10 | 73/744 |
| 2014/0238156 A1 * | 8/2014 | Aljohani | G01F 23/02 | 73/864.63 |
| 2014/0311240 A1 * | 10/2014 | Fitch | F01M 11/0408 | 73/334 |

FOREIGN PATENT DOCUMENTS

| | | |
|---|---|---|
| GB | 909527 | 10/1962 |
| JP | 2002105464 A | 4/2002 |
| WO | 9707051 A | 2/1997 |

OTHER PUBLICATIONS

International Search Report and Written Opinion dated Feb. 1, 2016, received in counterpart International Application No. PCT/GB2015/051833, 16 pgs.

International Preliminary Report on Patentability from International Application No. PCT/GB2015/051833, dated Jan. 5, 2017, 10 pp.

* cited by examiner

SIGHT GLASS APPARATUS

This application is a U.S. national phase application under 37 U.S.C. § 371 of international application number PCT/GB2015/051833 filed on Jun. 23, 2015, which claims the benefit of priority to GB application number 1411258.5 filed Jun. 25, 2014. The entire contents of each of international application number PCT/GB2015/051833 and GB application number 1411258.5 are incorporated herein by reference.

FIELD OF THE INVENTION

The present invention relates to a sight glass apparatus. Embodiments of the present invention relate to a sight glass apparatus with added levels of safety when using a sight glass with high pressure fluids, some of which may also be combustible.

BACKGROUND TO THE INVENTION

Sight glasses can be fitted to vessels, chambers and pipes to enable an operator or an optical sensor to observe the interior of the vessel, chamber or pipe, for example to view a liquid level or behaviour. A sight glass generally comprises a (usually circular) pane of toughened glass within a metal surround. The sight glass can be installed to a vessel by welding, bolting or clamping the metal surround to an opening in the vessel, chamber or pipe.

While sight glasses are commonly used in many industries, sight glasses are not used in natural gas process and distribution systems. The reason for this is that a sight glass failure within the high pressure environments of these systems would be catastrophic and pose a large risk for oil and gas industries.

Some attempts have been made to minimise the impact of a sight glass failure. For example, it has been proposed that a secondary sight glass of the same diameter as the primary sight glass could be mounted directly behind the primary sight glass. However, there is a problem with this—if the primary sight glass fails under pressure, the debris from the failed primary sight glass would impact the secondary sight glass and cause it to fail as well. Some previous attempts at improving the safety of sight glasses are described in CN202778414, CN202580005, U.S. Pat. No. 4,415,235, GB1487056, GB909527 and EP2159619.

Embodiments of the present invention seek to address these problems, and to improve safety when using sight glasses in high pressure systems.

SUMMARY OF THE INVENTION

According to an aspect of the present invention, there is provided a sight glass apparatus for viewing the interior of a pressurised vessel, chamber or a pipe conveying fluid under pressure, the sight glass apparatus comprising:

a sight glass assembly mounted over an opening into the vessel, chamber or pipe, the sight glass assembly comprising a sight glass adjacent the opening which provides a window to the inside of the vessel, chamber or pipe; and a containment vessel mounted behind and/or around the sight glass assembly for containing fluid exiting the opening in the pipe in the event that the sight glass assembly fails.

In this way, even if the sight glass assembly fails, the pressurised fluid within the pressurised vessel, chamber or pipe is safely contained.

While the containment vessel may be used in conjunction with a sight glass assembly which comprises a single sight glass, in some embodiments the sight glass is a first sight glass, and the sight glass apparatus comprises a second sight glass mounted behind and spaced away from the first sight glass, the first and second sight glasses providing a window to the inside of the pipe. The use of first and second sight glasses within the sight glass assembly reduces the likelihood of a complete failure of the sight glass assembly. As discussed above, simply using two sight glasses together does not necessarily result in any improvement in safety, since failure of the first sight glass may generate debris which immediately collides with and breaks the second sight glass. Two solutions to this problem have been identified. Firstly, a space between the first sight glass and the second sight glass may contain a transparent liquid or gel. This material within the space serves to slow down debris from the first sight glass, and also to equalise the pressure exerted on the second sight glass across its surface (without the liquid or gel material within the space it is likely that pressure on the second sight glass would be likely to be concentrated over a small area). Secondly, either instead of or in addition to the presence of liquid or gel within the space, the first sight glass and the second sight glass can be positioned close enough together that in the event of the first sight glass failing, debris from the first sight glass will strike the second sight glass before reaching a velocity sufficient to cause the second sight glass to fail. In this way, the space between the sight glasses can be set to a distance which on the one hand is sufficient that the cause of failure of the first sight glass is not immediately transmitted into the second sight glass, and on the other hand is small enough that the debris from the first sight glass will not have reached a velocity sufficient to cause the second sight glass to fail (as driven by the flow of high pressure fluid from behind it) when it strikes the second sight glass.

Preferably, an optical sensor is mounted within the containment unit for viewing the interior of the pipe through the sight glass assembly. The containment vessel may comprise one or more optical elements for defining an indirect optical path between the sight glass and the optical sensor, the optical sensor being mounted out of a direct path from the primary sight glass. As a result, should the sight glass assembly fail, the risk of damage to the optical sensor is reduced. It will be appreciated that the optical elements which define the optical path have less mass than the optical sensor, and upon destruction are likely to cause less consequential damage to other components within the containment vessel. Also, in the case of combustible fluids, reducing the likelihood of damage to the optical sensor is likely to reduce the risk of ignition of the fluid (because the optical sensor comprises electronic components and an electricity supply).

In some cases, an impact resistant element is interposed between the sight glass and an optical element, further sight glass, or feed-through provided within or in a wall of the containment vessel. If the impact resistant element is protecting an optical element or further sight glass then it should be transparent. It will be appreciated that various optical elements, sight glasses (in the wall of the containment vessel), and feed-throughs (again in the wall of the containment vessel) may be provided, and that these may (a) form relatively weak points which could be vulnerable to damage from debris, and (b) components which are expensive to replace. The use of an impact resistant element reduces the risk of damage to these components. Preferably, the impact resistant element is a transparent plate oriented at an angle with respect to the plane of the sight glass. As a result, debris is redirected towards e.g. a wall of the containment vessel, and is also less likely to fall back down into the pipe.

In some cases, the face of each sight glass in the sight glass assembly is provided with an optical coating.

A further sight glass may be mounted in a wall of the containment vessel, the sight glass apparatus comprising an optical sensor mounted outside of the containment vessel to view the interior of the pipe along an optical path which passes through the sight glass assembly and the further sight glass. By mounting the optical sensor outside of the containment vessel, risk of damage to the optical sensor is reduced, as is the risk of combustion of fluids. Preferably, one or more optical elements are provided within the containment vessel for defining an indirect optical path between the sight glass assembly and the further sight glass, the further sight glass being mounted out of a direct path from the sight glass assembly.

In some cases, the sight glass mounted in the wall of the containment vessel may be a different size (smaller or larger) than the sight glass of the sight glass assembly.

The optical sensor may be a camera, a spectrometer or any other sensor device utilising optical means to view or sense the inside of the vessel, chamber or pipe.

A shielding element may be mounted with respect to the further sight glass to protect the further sight glass from debris in the event of the sight glass assembly failing. The shielding element comprises a part-cone shaped element which substantially surrounds the further sight glass, and effectively blocks a direct path between the sight glass assembly and the further sight glass.

Preferably, the pressure within the containment unit is higher than atmospheric pressure, reducing the pressure differential across the sight glass assembly and thus reducing the likelihood of failure.

Preferably, the containment vessel comprises a bursting disk mounted in a wall of the vessel.

In some embodiments, at least a portion of the inside walls of the containment vessel are provided with an impact absorbent lining to absorb debris in the event of the sight glass assembly failing. This reduces the risk to components of debris ricocheting within the interior of the containment vessel.

In some embodiments, a debris retaining element is mounted around the sight glass assembly to inhibit debris from falling into the pressurised vessel, chamber or pipe. The debris retaining element may be a tube or a collar.

Preferably, a valve assembly is mounted inside the pressurised vessel, chamber or pipe, the valve assembly being responsive to the failure of the sight glass assembly to close off the opening. This provides additional protection in the event of a sight glass failure. The failure response of the valve assembly could either be automatic (for example a slam valve) or triggered from a pressure sensor in the containment vessel.

According to another aspect of the present invention, there is provided a sight glass apparatus for viewing the interior of a pressurised vessel, chamber or a pipe conveying fluid under pressure, the sight glass apparatus comprising:

a sight glass assembly mounted over the an opening into the vessel, chamber or pipe, the sight glass assembly comprising a first sight glass adjacent the opening and a second sight glass mounted behind and spaced away from the first sight glass, the first and second sight glasses providing a window to the inside of the vessel, chamber or pipe;

wherein a space between the first sight glass and the second sight glass contains a transparent liquid or gel.

According to another aspect of the present invention, there is provided a sight glass apparatus for viewing the interior of a pressurised vessel, chamber or a pipe conveying fluid under pressure, the sight glass apparatus comprising:

a sight glass assembly mounted over an opening into the vessel, chamber or pipe, the sight glass assembly comprising a first sight glass adjacent the opening and a second sight glass mounted behind and spaced away from the first sight glass, the first and second sight glasses providing a window to the inside of the vessel, chamber or pipe;

wherein the first sight glass and the second sight glass are sufficiently close together that in the event of the first sight glass failing, debris from the first sight glass will strike the second sight glass before reaching a velocity sufficient to cause the second sight glass to fail.

Preferably, the first sight glass and the second sight glass are spaced apart by between 0.5 mm and 10 mm. More preferably, the first sight glass and the second sight glass are spaced apart by between 0.5 mm and 5 mm. More preferably, the first sight glass and the second sight glass are spaced apart by between 0.5 mm and 2 mm. More preferably, the first sight glass and the second sight glass are spaced apart by between 1 mm and 2 mm.

According to another aspect of the present invention, there is provided a sight glass apparatus for viewing the interior of a pressurised vessel, chamber or a pipe conveying a fluid under pressure, the sight glass apparatus comprising:

a sight glass assembly mounted over the an opening into the vessel, chamber or pipe, the sight glass assembly comprising a sight adjacent the opening which provides a window to the inside of the pipe; and a valve assembly mounted inside the vessel, chamber or pipe, the valve assembly being responsive to the failure of the sight glass assembly to close off the opening.

In this way, even if the sight glass assembly fails, the pressurised fluid within pressurised vessel, chamber or pipe is safely contained.

Preferably, the valve assembly comprises a flap valve which under normal conditions is in an open position, and which is urged into a closed position by the flow of fluid from the pressurised vessel, chamber or pipe through the sight glass assembly in the event that the sight glass assembly fails. Preferably, the flap valve is retained in the closed position by a pressure differential between the two sides of the flap valve.

It will be understood that the pipe or vessel may contain high pressure fluids, which may include natural gas, combustible gas or hydrocarbon liquids.

This system provides added levels of safety should a sight glass fail in use with high pressure systems. The high pressure fluid would be contained. In some embodiments the high pressure fluid would be isolated, and flow would automatically shut-off to improve safety of operators.

Embodiments of the present invention are particularly beneficial where the pipe or vessel contains high pressure combustible gas and/or a natural gas.

It may also be preferable for the containment vessel of the sight glass apparatus to be located partially or fully within a flange mounted over an opening of a vessel, chamber or pipe. Such an embodiment of the invention is advantageous as it may reduce the volume of the sight glass apparatus external to the vessel, chamber or pipe. Additionally, systems for flanges may be highly standardised, allowing a flange containing a sight glass apparatus to be easily retrofitted to many pressurised systems with commonly available tools and fittings.

Preferably, the sight glass apparatus may include a sight glass assembly comprising a plurality of sight glasses adjacent an opening into the vessel, chamber or pipe which provides a window to the inside of the vessel, chamber or pipe. Such an embodiment is advantageous as the individual windows may be reduced in size, such a reduction in size being accompanied by a reduction in the strength required to withstand the pressure in the chamber, pipe or vessel. Additionally, as the required strength is reduced, the sight glasses may be thinner and glass of a reduced optical quality used for their construction, decreasing costs.

In some embodiments it may be preferable for the vessel, chamber or pipe to be illuminated through at least one of the sight glasses, and the vessel, chamber or pipe to be observed with an optical sensor through at least one other sight glass. Such a situation may be advantageous as it may reduce the glare experienced by the optical sensor, increasing its sensitivity. Additionally, such an embodiment may allow the use of multiple light sources and/or optical detectors, each optimised for the observation of different properties in the chamber, vessel or pipe.

It may be preferable for the vessel, chamber or piper to be illuminated through at least one peripheral sight glass, and the vessel, chamber or pipe to be observed with an optical sensor through a central sight glass. Such an embodiment may be preferable as the glare experienced by the optical sensor is further reduced in such an apparatus.

Preferably, a secondary seal may comprise at least one high pressure connector. The inclusion of a high pressure connector in a secondary seal is advantageous as it provides a mean of allowing power and data to be transferred to and from any optical sensors located within the sight glass vessel without compromising the integrity of the secondary containment provided by the sight glass apparatus.

It may also be preferable to protect the high pressure connector from debris in the event of the sight glass apparatus failing with a shield. Such an embodiment may be preferable as it would help prevent the complete failure of the sight glass apparatus in the event of a sight glass or primary seal failure.

Preferably, the sight glass apparatus may further comprise a pressure sensor. The inclusion of a pressure sensor in the sight glass apparatus may be desired as a means of alerting the user when pressure begins to rise in the sight glass apparatus, potentially as part of a warning system.

Preferably, such a warning system may further comprise a valve assembly mounted inside the vessel, chamber or pipe, the valve assembly being responsive to the pressure sensor. Such a system may be advantageous as it may allow for the sight glass apparatus to be isolated from the chamber, vessel or pipe in case of a failure of either the primary seal, the secondary seal, or both seals. Here, the risk of the entire pipe, chamber or vessel being compromised by a faulty sight glass apparatus is greatly reduced.

Preferably, the valve may comprise a flap valve, ball valve or double block and bleed valve.

It may also be preferable for the sight glass apparatus to include a desiccant. The inclusion of a desiccant would reduce the presence of water or water vapour in the secondary containment vessel, potentially increasing the working lifespan of any electrical, mechanical, chemical or structural component house in this vessel.

Additionally, it may be preferable for the sight glass apparatus to further comprise an oxygen absorber. The presence of an oxygen absorber in the secondary containment vessel may lead to a reduction in oxidation of any components or equipment housed in this vessel. A reduction in the level of oxygen may also reduce the risk of explosion or fire if flammable material contained in the pipe, chamber or vessel were to leak into the secondary containment vessel.

DETAILED DESCRIPTION

The invention will now be described by way of example with reference to the following Figures in which.

Figure 3:
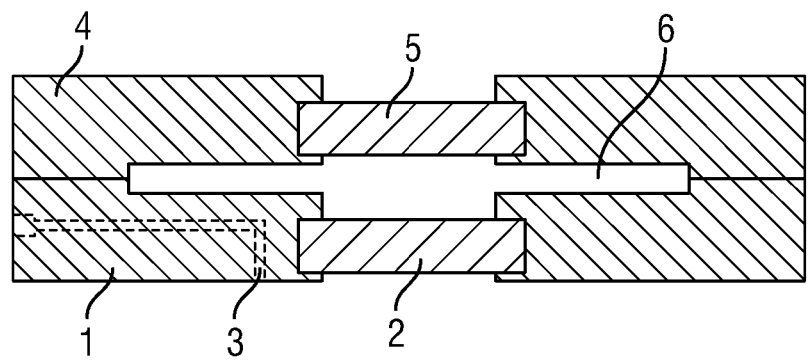
Figure 4:
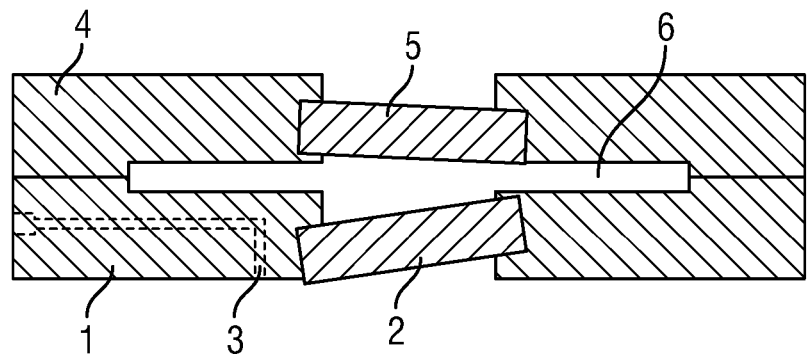
Figure 5:
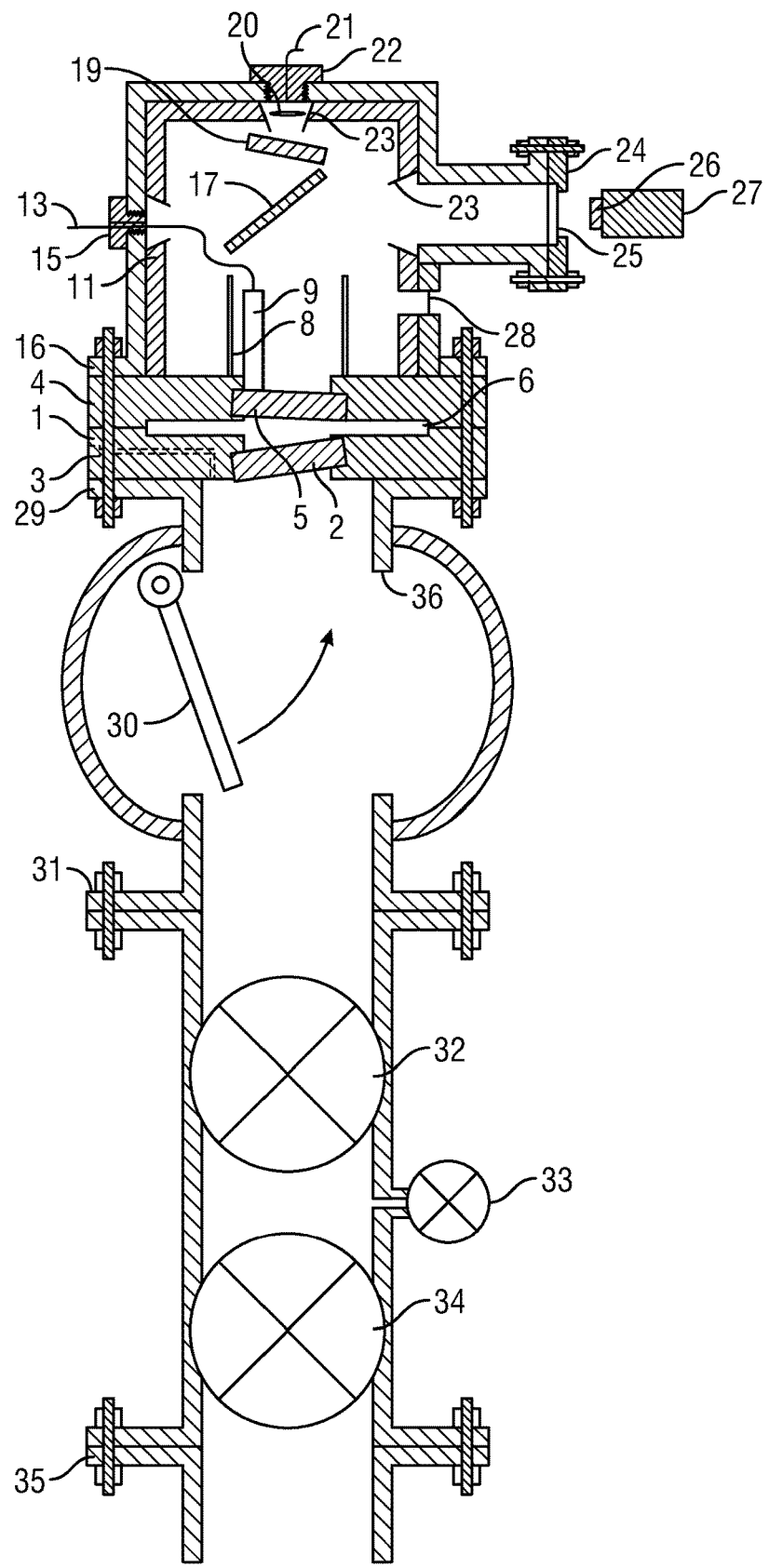
Figure 6:
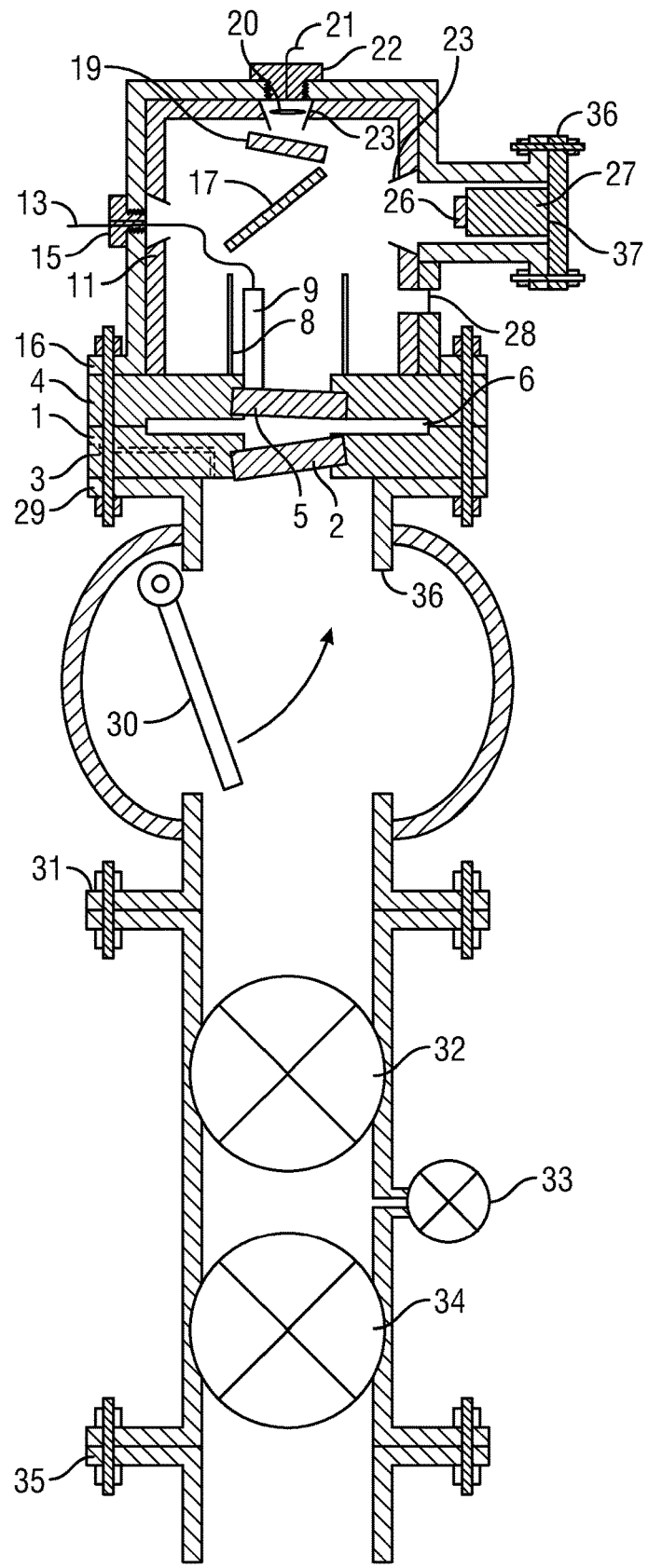

FIG. 3 schematically illustrates a double sight glass assembly according to one embodiment of the present invention;

FIG. 4 schematically illustrates a double sight glass assembly according to another embodiment of the present invention;

FIG. 5 schematically illustrates a sight glass apparatus comprising a double sight glass assembly, a secondary containment vessel and an emergency flap valve, in which an imaging device (or other optical components) is mounted outside of the secondary containment vessel; and FIG. 6 schematically illustrates another sight glass apparatus comprising a double sight glass assembly, a secondary containment vessel and an emergency flap valve, in which an imaging device (or other optical components) is mounted inside of the secondary containment vessel.

Figure 7:
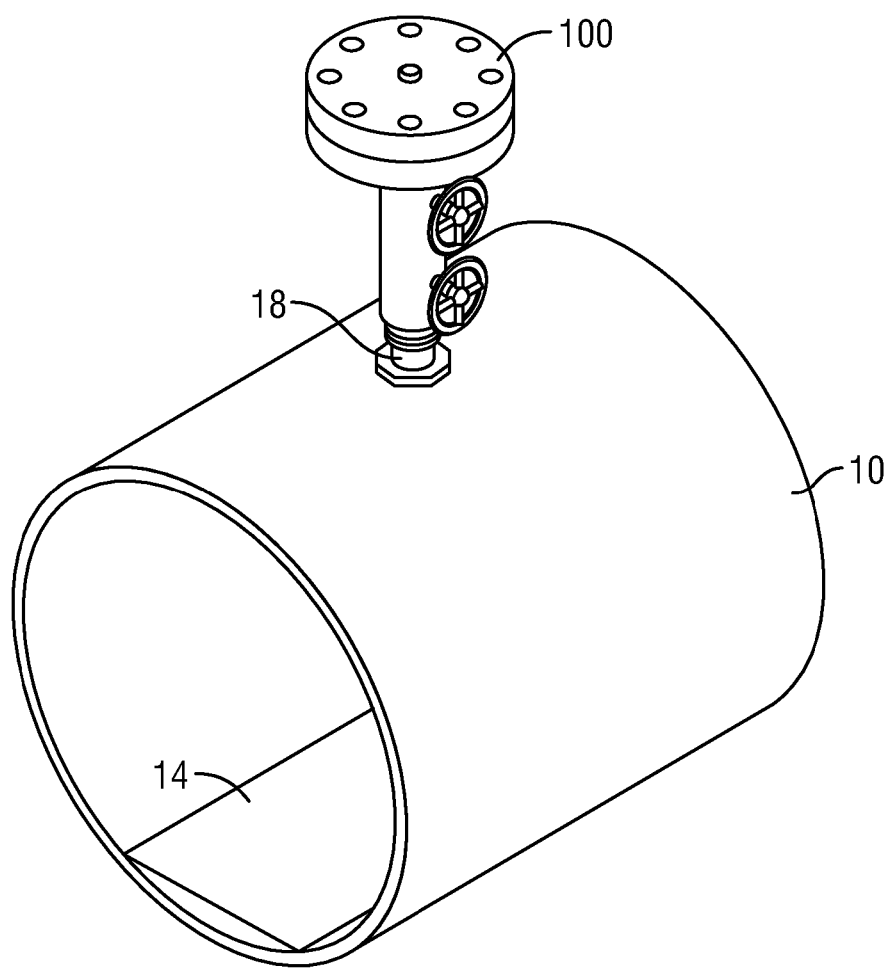

FIG. 7 schematically illustrates a perspective view of an embodiment of the present invention mounted to a vessel.

Figure 8:
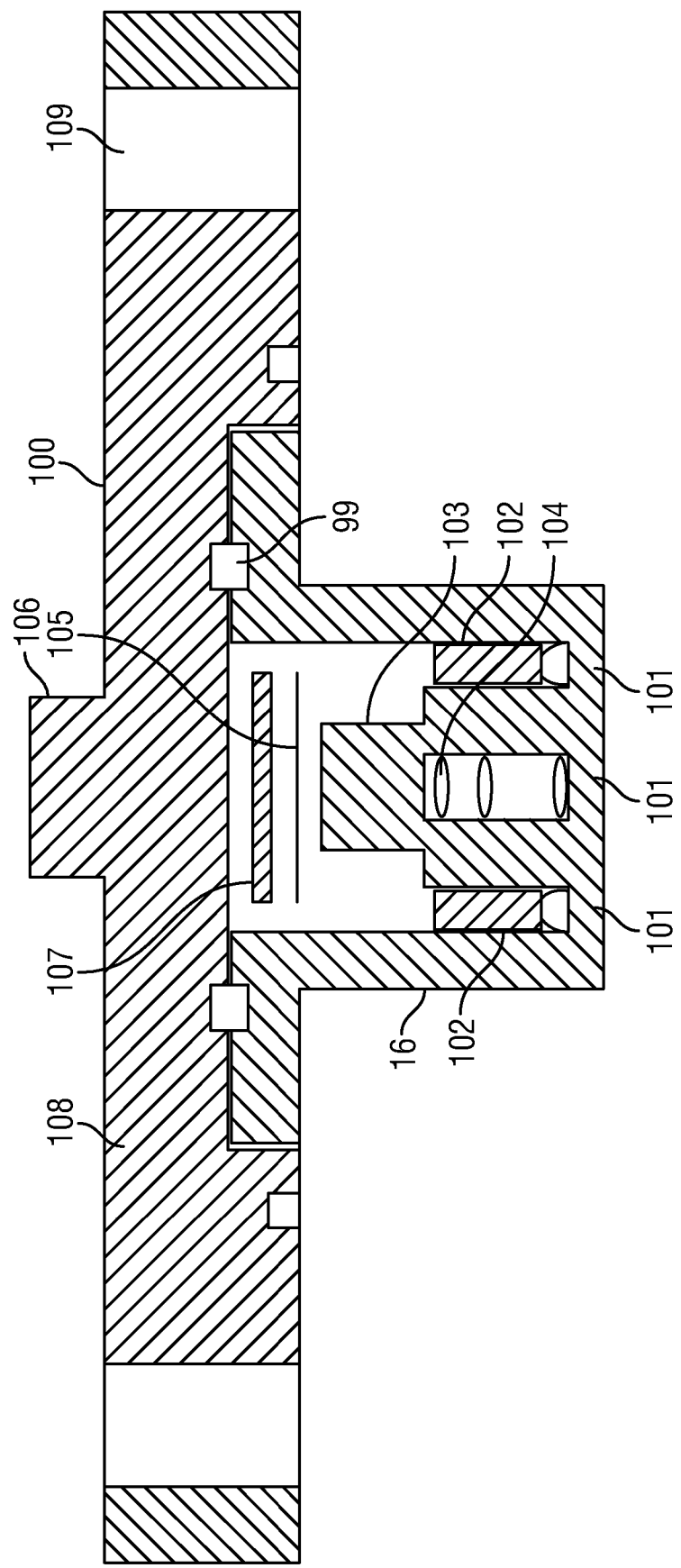

FIG. 8 schematically illustrates a flange mounted sight glass assembly according to another embodiment of the present invention.

Figure 9:
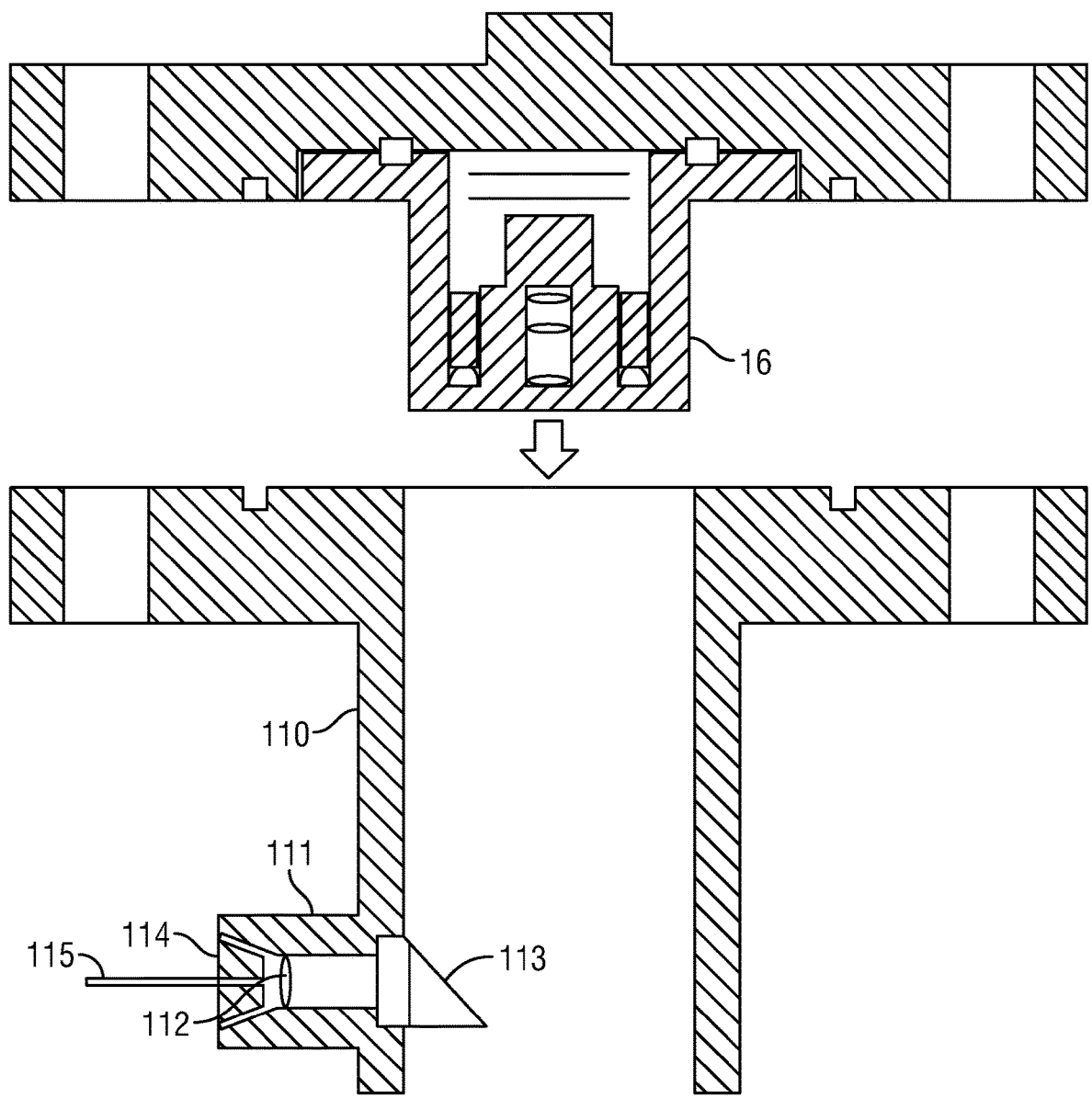

FIG. 9 schematically illustrates a flange mounted sight glass assembly according to a further embodiment of the present invention.

Figure 10:
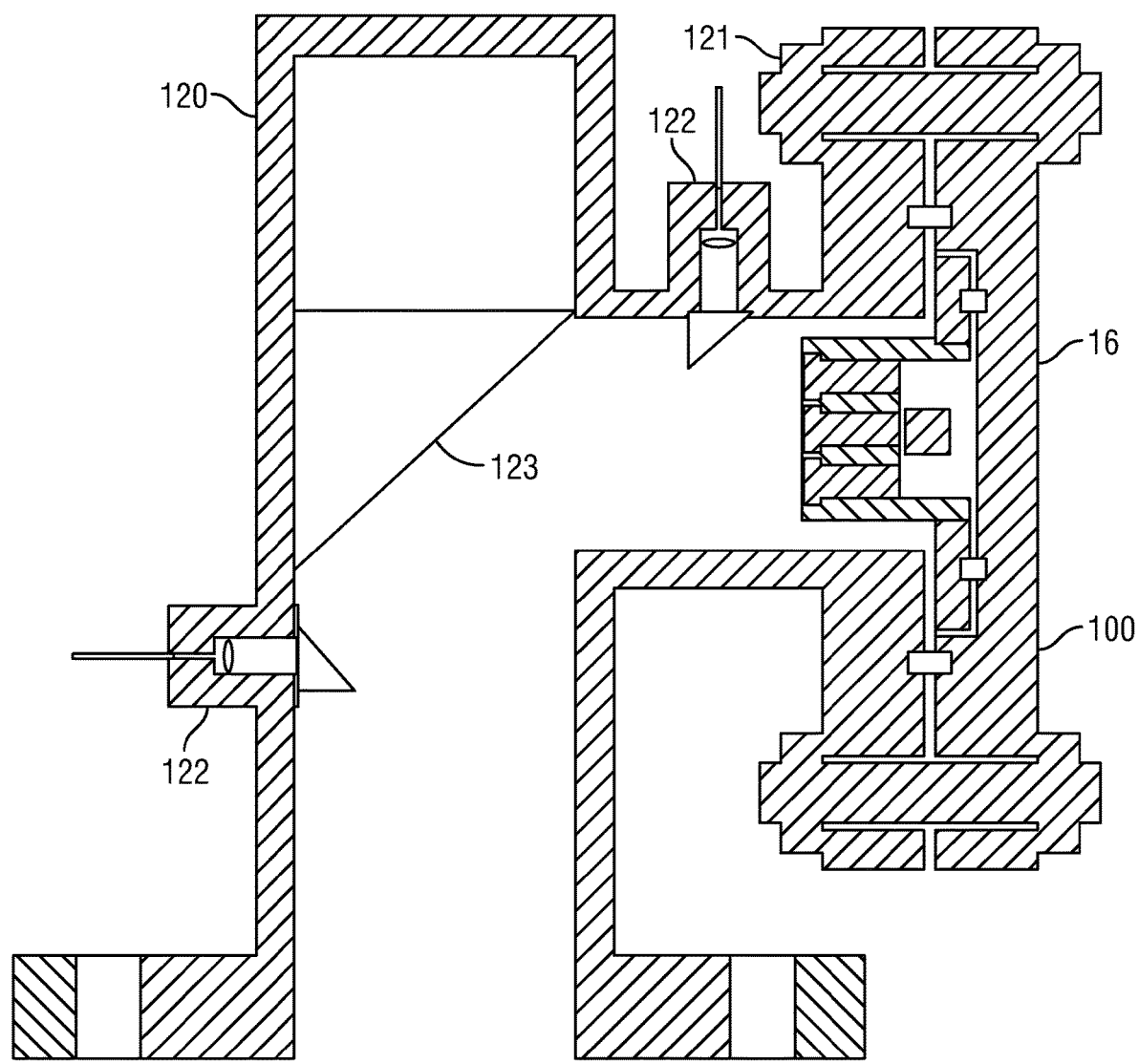

FIG. 10 schematically illustrates a flange mounted sight glass assembly mounted in a Tee Piece.

Figure 11:
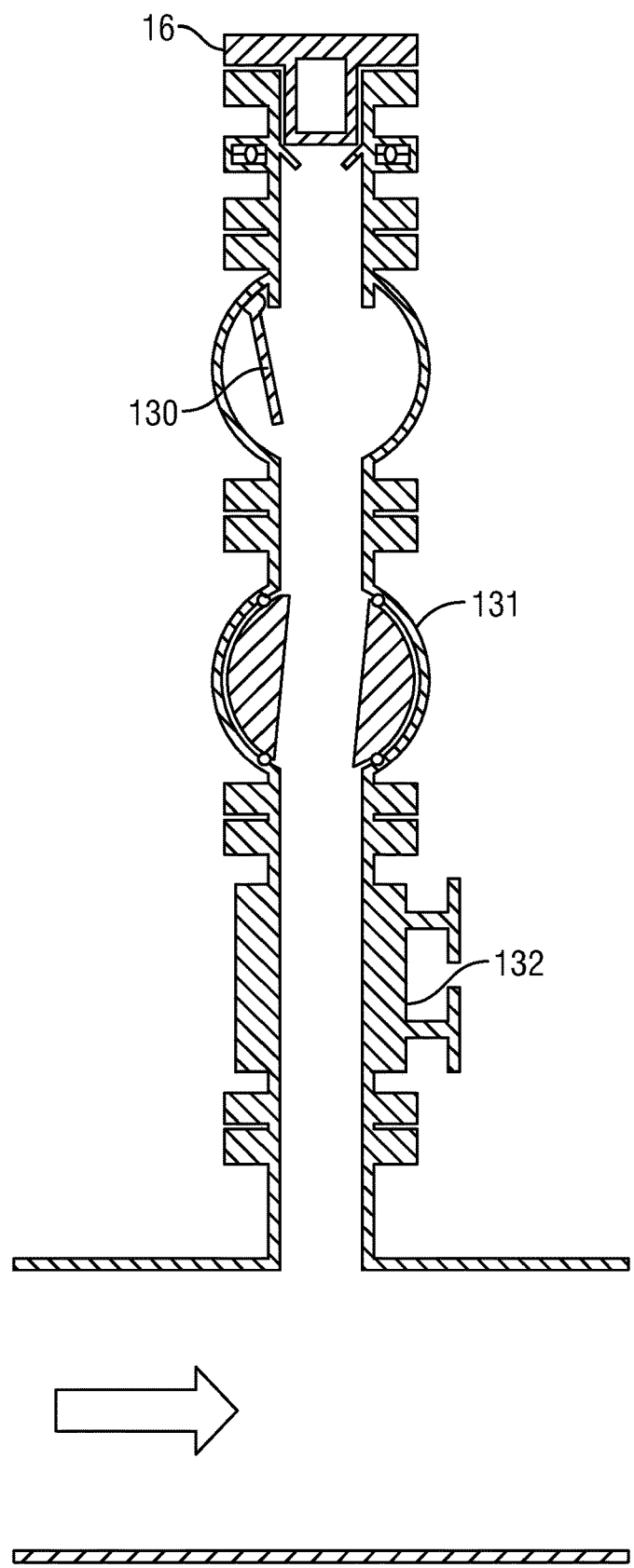

FIG. 11 schematically illustrates a flange mounted sight glass assembly, further comprising emergency valves.

Figure 1:
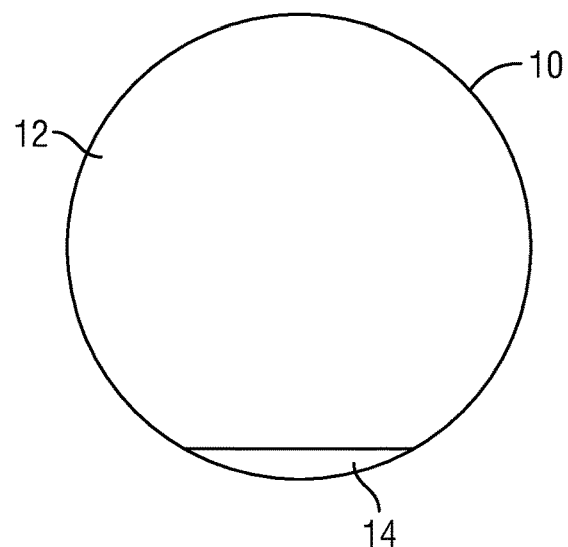
FIG. 1 is a schematic cross-sectional view through a vessel in the form of a gas pipeline.

FIG. 1 shows a schematic cross-section of a gas pipeline which may form part of a national transmission system (NTS) for conveying gas. The gas pipeline 10 includes a region containing gas 12 and a region which contains a liquid 14. The gas within the vessel (in this case the gas pipeline 10) is at an elevated pressure relative to atmospheric pressure. For example, the gas may have a pressure of above about 20 atmospheres. In some cases the gas may have a pressure of up to about 400 atmospheres. It can be seen that if a liquid contaminant 14 is present in the gas pipeline 10 the liquid contaminant may collect at the lowest point of the gas pipeline 10 so as to form a pool of liquid contaminant. It is possible that in some cases, such as for a fast flowing gas, the liquid may not pool at the bottom of the pipe. Instead, for example, the liquid may form a full annular flow around the inner circumference of the pipe, although even in this case it can be expected that a large portion of the liquid will drop to the bottom of the pipeline. In any case, it is desirable to have visibility of events inside the pipe.

Figure 2:
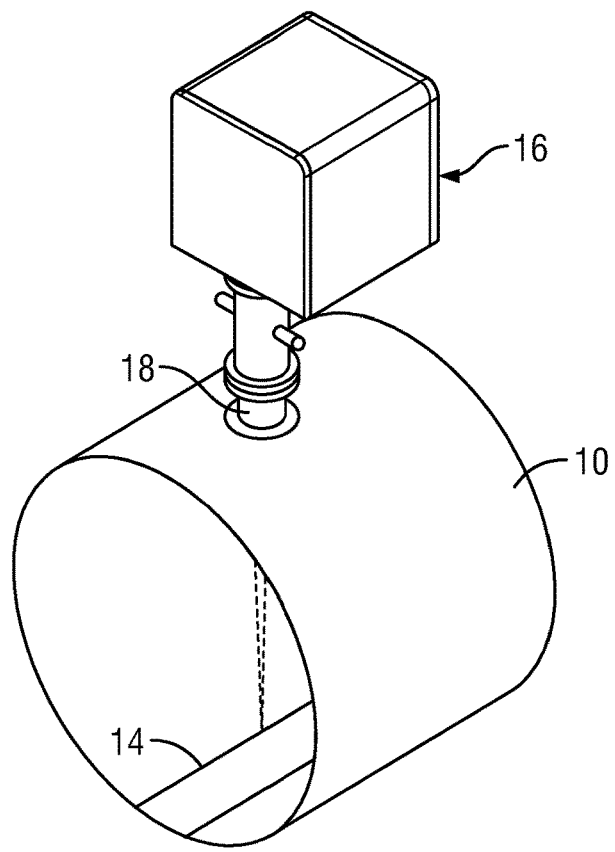
FIG. 2 shows a schematic perspective view of a portion of an embodiment of the present invention mounted to a vessel.

FIG. 2 shows a secondary containment vessel 16 which is mounted via a spur pipe to the gas pipeline 10 at a tapping point 18. The secondary containment vessel 16 contains optics, and in some cases an imaging device, which are able to view the interior of the gas pipeline 10 through an opening in the gas pipeline 10 provided by the spur pipe 18.

FIG. 3 schematically illustrates a double sight glass assembly designed to improve safety when using sight glasses with high pressure systems. The double sight glass assembly comprises a primary sight glass 2 mounted within a flange mounting 1. The primary sight glass 2 is a pressure rated sight glass, formed from a suitable optically transparent material, and is designed and tested to exceed the maximum design pressure of the system on which it is to be mounted. The flange mounting 1 is a rigid mount capable of retaining pressurised fluids within a vessel. A vent 3 can be provided within the flange mounting 1 to allow gas to be purged and vented from the inside of the vessel to outside of the vessel and the sight glass assembly. The vent 3 effectively provides a channel between the inside of the vessel, chamber or pipe and the outside of the vessel, chamber or pipe (and outside the secondary containment vessel if present), and can in an opened state (in which gas from inside the vessel, chamber or pipe is released under its own pressure) and a closed state (in which no release of gas occurs). This arrangement can be used to purge relatively high oxygen content and wet gas from adjacent to the primary sight glass 2. In some cases the wet gas may cause condensation and vent 3 may be used in combination with a heater (not shown) which is in thermal communication with the primary sight glass 2 to remove, reduce or prevent the build-up of condensation on the sight glass 2. A secondary sight glass 5 of a similar diameter to the primary sight glass 2 is mounted behind the primary sight glass 2, with the primary sight glass 2 being adjacent to an opening into the vessel (and thus adjacent to and in contact with the high pressure fluid within the vessel) and the secondary sight glass 5 being further from the opening and not in contact with the high pressure fluid within the vessel (unless the primary sight glass 2 should fail). The secondary sight glass 5 is mounted within a flange mounting 4, and the flange mounting 4 is mounted directly (or indirectly) to the flange mounting 1. A space 6 is provided between the primary sight glass 2 and the secondary sight glass 5, and this space contains, and is preferably substantially filled, with a transparent liquid or gel. The liquid or gel may be a refractive index matching liquid conventionally used for optical coupling. These are used in optical coupling and the liquid matches the refractive index of the glass either side to improve the efficiency of the coupling. These are available from a number of suppliers. If the sight glass is to be used to permit optical access to the pipe for the purposes of Raman or absorption spectroscopy then care will need to be taken as the spectrometer will also receive a signal from the liquid or gel between the two sight glasses. However, for simple imaging systems this will not be a problem. The liquid or gel could also be any liquid or gel that is transparent in the wavelengths the system is operating in. The gap between the sight glasses 2 and 5 is a small distance (e.g. a few millimetres) to prevent the acceleration of debris from the primary sight glass 2, should the primary sight glass 2 fail. This is advantageous because the momentum of the debris, which is the main factor in determining the likelihood of the debris causing failure of the second sight glass is the product of both the mass and the velocity at impact of the debris. The mass of the debris is fixed, but by reducing the velocity (using a liquid or gel filling) and/or by reducing the duration over which the acceleration applies (by reducing the distance to be travelled—i.e. the spacing between the sight glasses 6), the velocity at impact can be reduced, thus reducing the momentum. The liquid or gel also prevents spot pressure build up that could cause the second window to fail. In particular, pressure peaks are equalised in the event of the primary sight glass failing (the liquid or gel causes the force exerted against the secondary sight glass 5 to be spread more evenly against its surface than would otherwise be the case). If a second sight glass of a similar diameter is mounted directly behind the first, it is likely that, if the primary sight glass fails while in operation with a high pressure fluid, the debris would impact the secondary sight glass. When the space between the two sight glasses is filled with a transparent liquid or gel as is the case with the present embodiment, the liquid or gel absorbs and mitigates the impact of debris on the second sight glass. It will be understood that by positioning the first sight glass and the second sight glass sufficiently close together, in the event of the first sight glass failing, debris from the first sight glass will strike the second sight glass before reaching a velocity sufficient to cause the second sight glass to fail, and more preferably while it is still travelling much more slowly than this. It will be appreciated that it would be possible to rely only on the use of an appropriate separation between the primary and secondary sight glass, without the presence of a liquid or gel filling. However, preferably the double sight glass assembly is provided both with an appropriate separation between the primary and secondary sight glass, and also with an appropriate liquid/gel filling.

The actual optimum separation between the first and second sight glasses may be highly dependent on considerations such as:

(a) The likely failure mode (e.g. impact form debris already within the pipe or a mechanical flaw in the first sight glass);

(b) The fluid pressures involved; and (c) Whether or not the space is filled with liquid or gel.

Suitable separation distances are likely to be of the order of millimetres. For example, the first sight glass and the second sight glass may be spaced apart by between 0.5 mm and 10 mm. More preferably, between 0.5 mm and 5 mm. More preferably, between 0.5 mm and 2 mm. More preferably, between 1 mm and 2 mm.

FIG. 4 schematically illustrates a variant of FIG. 3 in which both the primary sight glass 2 and the secondary sight glass 5 are mounted within their respective mounts 1, 4 at an angle with respect to one or more of (a) the plane of the sight glass mounts, (b) a plane perpendicular to a the longitudinal axis of the spur pipe, and (c) an optical viewing axis from an optical sensor mounted behind the secondary sight glass 5 into the vessel. By mounting the sight glasses at an angle in this way, reflections of light (either light being projected from outside the vessel, through the sight glasses and into the vessel, or light being emitted or reflected from inside the vessel through the sight glasses to an optical sensor outside the vessel) into other optical components can be reduced. Preferably, in order to reduce reflections the angle is greater than 0° but less than approximately 10°. The angled sight glass also increases the thickness of sight glass to pressure (and impacts) exerted perpendicular to the sight glass mount and allows some of the force of an impact to be deflected rather than absorbed by the sight glass. In other words, the angled sight glass may also increase the resilience of the sight glass assembly to pressure and impacts, thus improving safety. In order to achieve a significant improvement in this regard then preferably an angle of greater than approximately 10° is used.

In addition to, or instead of a secondary sight glass, a secondary pressure containment vessel (SCV) may be mounted behind or around the sight glass assembly. FIG. 5 schematically illustrates an example of such an arrangement. In the case of FIG. 5, a secondary containment vessel 16 is provided in addition to a secondary sight glass, but in alternative embodiments the secondary containment vessel may be provided as an alternative to the secondary sight glass. In the event of the primary (and secondary if fitted) sight glass failing the high pressure fluid is contained within the secondary containment vessel. FIG. 5 also shows a mounting valve in the high pressure system which offers additional safety. The mounting valve may be provided either as well as or instead of one or both of the secondary sight glass and the secondary containment vessel. It can be seen from FIG. 5 that a valve unit 32, 33, 34 is mounted vertically above and to a flange mount at an opening into the existing pipework or pressure vessel 35. The valve unit 32, 33, 34 in this case is a double block and bleed valve unit which comprises a first block valve 34, a second block valve 32, and a bleed valve 33, which allows the volume between the first and second block valves 34, 32 to be vented. A flap valve unit 30, 31 is mounted vertically above and to a flange mount of the valve unit 32, 33, 34 using a flange mount 31. The primary sight glass 2 is mounted above and to the flap valve unit 30, 31 using the flange mount 1. The secondary sight glass 5 is mounted above and to the primary sight glass 2 using the flange mount 4. The secondary containment vessel 16 is mounted vertically above and to the secondary sight glass 5.

The secondary containment vessel (SCV) 16 is designed to meet and comply with pipeline specifications and is able to contain full design pressure for the high pressure system. The secondary containment vessel 16 is intended to contain process fluid in the event of the primary (and secondary, if present) sight glass failing. The secondary containment vessel 16 defines a closed chamber which is mounted onto the mount 4 of the secondary sight glass 5. It will be appreciated that if a secondary sight glass is not being used then the secondary containment vessel 16 will be mounted onto the mount 1 of the primary sight glass 2. A raised collar or debris tube 8 is installed around the sight glass 5 to minimise the amount of debris falling back into the pipeline in the event of the primary and secondary sight glass assemblies failing. Within the debris tube 8, a lens assembly 9 for a fibre optic or light pipe 13 is provided. The lens assembly 9 is placed next to or on the sight glass 5 to allow light to be conveyed to the sight glass 5 via the fibre optic or light pipe 13 and projected through the sight glasses 5 and 2 while minimising reflections. The fibre optic or light pipe and lens assembly may allow lines, shapes and patterns (of light, for example laser light) to be projected through the sight glasses 5, 2 and into the pipe below. The lens assembly 9 may be conveniently mounted in place by way of attachment (not shown) to the debris tube 8. The fibre optic or light pipe 13 allows light from a light source to be injected from outside the secondary containment vessel. The fibre optic or light pipe 13 enters the secondary containment vessel 16 via a pressure rated feed through 15, which allows the pressure rating of the secondary containment vessel 16 to be maintained (that is, the feed through 15 does not act as a vulnerability in the system which reduces the pressure rating of the secondary containment vessel as a whole to an unacceptable level). Alternatively, as will be explained further below, an illumination device may be mounted outside (or inside) of the pressure containment vessel 16 without the use of a fibre optic or light pipe and project light through an appropriate sight glass in the secondary containment vessel 16 wall and other optical elements to illuminate the pipeline or pressure vessel.

The inner walls of the secondary containment vessel 16 are lined with a material (absorbent inner lining) 11 suitable to catch, absorb and hold debris that would result from a failure in the sight glass assembly, thereby reducing the incidents of impact on components within the secondary containment vessel 16 and thus minimising damage to those components. In some embodiments this inner lining could be the entire volume of the SCV apart from the light paths that are required to get light in and out of the pipeline A mirror, dichroic or other reflective surface 17 is mounted within the secondary containment vessel at such an angle to reflect illumination along an optical path which enables an imaging sensor to be out of direct line with the sight glass assembly. The mirror 17 reflects light, or certain wavelengths of light, at an angle so that other (imaging) components are not in direct line of debris in the event of a sight glass failure. The mirror 17 may have a hole in to allow some light to pass through or may not be fully reflective and may act as a beam splitter. A toughened or rigid component 19 (section of toughened glass or similar) is mounted at an angle within the secondary containment vessel 16. This is to prevent debris from the sight glass assembly and mirror hitting a secondary sight glass or lens and feed through which may be mounted in line with the sight glass assembly. In the present example a fibre optic 21 for introducing light or extracting light in or out of the secondary containment vessel 16 enters the secondary containment vessel via a pressure rated fibre feed through 22 (similar to the feed through 15 described above). This is provided within a wall of the secondary containment vessel opposite to the sight glass assembly. The presence of the toughened component 19 serves to protect the fibre optic 21, feed through 22 and an associated lens or other optical component 20 which focuses, filters or modifies the light path in or out of the secondary containment vessel 16. The toughened component 19 is mounted at an angle so that any debris from the sight glass assembly which strikes it is redirected to (and absorbed by) the absorbent inner lining, thus reducing the likelihood of that debris falling back into the pipe.

In the present embodiment a camera and illumination system 26, 27 is mounted outside of the SCV. One reason for this is that when the system is used on a combustible gas system, in the event of the failure of the primary window, combustible gas would be present in the SCV. The pressurisation may damage the camera and illumination system, and create a source of ignition (from the electrical components present in the camera and illumination system). The camera and illumination system 26, 27 comprises a camera enclosure window 26, and an imaging and/or illumination device 27 comprising a camera, laser, LED or other optical component, which allows images to be obtained, or light to be injected, from outside the secondary containment vessel 16. In order that the imaging and/or illumination device 27 is provided with an optical path into the pipe via the secondary containment vessel 16, a tertiary sight glass 25 (this may be a "secondary" sight glass if the sight glass assembly between the secondary containment vessel 16 and the pipe only comprises a single (primary) sight glass 2) is provided in a side wall of the secondary containment vessel 16 (out of a direct line of debris from the primary sight glass). The tertiary sight glass 25 may be smaller (or larger) than the primary and/or secondary sight glasses 2, 5. The sight glass 25 is mounted to an opening in the secondary containment vessel via a sight glass mounting 24, which generally allows a camera or other components to be mounted externally of the secondary containment vessel 16 while having a view into the secondary containment vessel 16. In the present case the opening to which the sight glass mounting 24 is fitted is provided by a side chamber which extends from the main chamber of the secondary containment vessel 16 to an open end to which the sight glass mounting 24 is fitted. This places the sight glass 25 away from a direct debris path from the primary and secondary sight glasses 2, 5. It can be seen from FIG. 5 that an optical path is provided between the camera 27 and the interior of the pipe via the mirror 17 which redirects light at (in the present example) a right angle.

Each of the tertiary sight glass 25, and the fibre optic feed-throughs 15, 22 are mounted within the walls of the secondary containment vessel 16, and are effectively recessed with respect to the absorbent inner lining 11. In order to protect these elements (lenses, sight glasses or other components) from ricocheting debris in the event of a failure of the sight glass assembly, collars or shields 23 are fitted around them. The shield 23 may take the form of a part-conical metal collar which has its wide end mounted against the wall of the secondary containment vessel around the sight glass or other components which it is intended to protect, and which has its narrow end extending inwardly of the secondary containment vessel 16. It will be appreciated that the inwardly projecting (narrow) part of the cone may extend beyond the surface of the inner lining 11.

A bursting disk 28 or other pressure relieving element may be provided within a wall of the secondary containment vessel 16. This could be linked to a pressure relief system to safely remove gases in the event of a failure of the sight glass assembly. The bursting disk breaks automatically when the sight glass assembly fails and the pressure in the secondary containment vessel increases, thereby venting to a pressure relief system. It is possible to specify the pressure at which the bursting disk is to blow at. The secondary containment vessel could also have a pressure switch which would activate upon seeing a pressure higher than expected. This could trigger an external alarm and or activate an automatic valve to close as detailed below.

Preferably, in normal operation the pressure within the secondary containment vessel 16 is kept at a level which is higher than atmospheric pressure, but lower than the pressure within the pressurised vessel, chamber or pipe. In this way, the pressure differential across the sight glass assembly is lessened, reducing the likelihood of failure, and reducing the severity of a failure if it does occur.

The flap valve 30 is provided at the pipe/vessel side of the sight glass assembly, and is arranged/configured to automatically close upon high pressure being detected in the secondary containment vessel or if a flow of fluid in the volume of in front of the primary sight glass assembly is detected. While the type of valve used could be a full bore ball valve with diaphragm activation or an activated valve triggered from a pressure sensor signal, preferably a flap valve is used that will automatically close against a seal if a flow is present. While the sight glass assembly is intact, the flap valve 30 remains in its open position, which permits a line of sight down through the flap valve unit, the double block and bleed unit and into the pipe or vessel below. If the sight glass assembly fails, there will be a flow of fluid from the pipe through the (broken) sight glass assembly and into the secondary containment vessel (or to the atmosphere if no secondary containment vessel is provided). Some of this flow of fluid pushes against the flap valve 30 which moves it from its open position into a closed position, in which it contacts and is urged against a sealing ring 36 on the interior of the flap valve unit. The pressure on the pipe side of the flap can be expected to be higher than the pressure on the sight glass side of the flap, and this pressure differential will serve to keep the flap valve 30 in place against the seal 36, inhibiting the further escape of fluid from the pipe. In some cases the flap may be biased into its open position by a spring (not shown), with the fluid flow overcoming the spring bias to close the flap valve 30 and the pressure differential being sufficient to retain the flap valve 30 in its closed position against the spring bias. In other embodiments the flap valve may be provided with a biasing element which biases the valve into a closed position (in which case reliance on the fluid flow and pressure differential is not required), with a retaining/releasing element (again, not shown) being provided which retains the flap valve 30 in an open position (against the bias) during normal operation and which releases the flap valve 30 in the event of the sight glass assembly failing, allowing the biasing element to move the flap valve 30 into the closed position. The retaining/releasing element may itself be triggered to release the flap valve 30 in a number of ways, either in response to a sensor which senses a fluid flow, pressure change or sight glass breakage, manual activation, or under direct influence of those changes.

Referring now to FIG. 6, an alternative embodiment in which a camera and illumination system 26, 27 is mounted within the secondary containment vessel 16 is schematically illustrated. All other elements of FIG. 6 are identical to FIG. 5, and will not be described again. The camera and illumination system 26, 27 is mounted within the secondary containment vessel 16 on a mounting plate 37 or directly on the flange 36, which is mounted to an opening into the secondary containment vessel 16. As can be seen from FIG. 6, the camera and illumination system 26, 27 is mounted within a side chamber of the secondary containment vessel 16, reducing the likelihood of debris from a failure in the sight glass assembly reaching and damaging the camera and illumination system 26, 27. In order to support the camera and illumination system 26, 27, feed-throughs (not shown, but provided through the mounting plate 36), rated for the system pressure, are mounted in the walls of the secondary containment vessel 16 to allow power, data and images to be transmitted in and out of the secondary containment vessel 16. Data and images may also be transmitted via a wireless or blue tooth system, reducing the requirements on the feed-throughs.

Although a camera is described (either inside or outside of the secondary containment vessel) above, in practice many other optical and/or imaging systems could be used. For example, a spectrometer could be used to measure wavelengths of light emitted or absorbed from within the pipe. In some cases, all that may be monitored may be the power of the light signal returning, with a laser being used to inject light into the pipe. In this case, the camera device may be replaced with a "power meter" or any other device capable of characterising the nature of the returning light.

From the above description, it will be appreciated that additional safety is achieved in a sight glass assembly by way of providing one or more of the following features:
  (a) Providing a second sight glass in an assembly with transparent liquid or gel between the two sight glasses.
  (b) The second sight glass may be placed at an optimum distance away from the primary sight glass in order to reduce the acceleration and momentum of debris should the primary sight glass fail.
  (c) Providing a secondary pressure containment vessel mounted behind the sight glass assembly that contains the process pressure even when the primary sight glass assembly fails.
  (d) Providing viewing and illumination ports via a sight glass or sight glasses in the secondary containment vessel which may be a smaller diameter than the primary sight glass or sight glasses. There could also be a fibre optic or light pipe feed-through designed to meet the process pressure.

(e) An impact resistant glass may be mounted within the SVC in front of, and at an angle to, the secondary sight glass to deflect debris from the primary sight assembly glass should it fail.

(f) A mirror (or other reflective component) may be placed in the SCV to reflect illumination to, and images from, the primary sight glass. This allows the secondary sight glasses to be out of direct line with the primary sight glass assembly thereby reducing the likelihood of impact by debris from the primary sight glass assembly.

(g) A protective shield may be fitted around the secondary sight glass or feed-through to reduce the likelihood of debris hitting the sight glasses (or other components) in the wall of the secondary containment vessel in the event of the sight glass assembly failing.

(h) The secondary containment vessel may be lined with an absorbent material that will reduce the ricocheting of debris from the sight glass assembly within the secondary containment vessel and damaging the secondary sight glasses.

(i) The sight glasses and other optical components may be placed at an angle to reduce reflection and to deflect debris.

(j) To minimise the debris falling back into the pipeline or pressure vessel a tube (or similar) may be mounted on the upper surface of the primary sight glass assembly. When mounted vertically, debris expelled from the primary sight glass falls back to the floor of the secondary containment vessel and is prevented from returning to the pipeline.

(k) The sight glass assembly and secondary containment vessel may be used in conjunction with a suitable shut-off valve to isolate the sight glass system from the process pressure. This valve may be activated manually, automatically triggered upon a pressure increase in the secondary containment vessel or a flap valve that will close if flow occurs.

(l) Pressure in the secondary containment vessel may be higher than atmospheric pressure in order to lower the differential pressure across the primary sight glass assembly.

Improved operation can be achieved by the following:

The primary sight glass assembly may be heated to avoid condensation if the pressure system has exceeded the dew point (water, hydrocarbon, alcohol, acid or other)

(ii) A small vent may be provided below the primary sight glass assembly to allow the volume between the valve and the sight glass to be purged of atmospheric air thereby reducing oxygen and water vapour levels.

(iii) The secondary sight glass may also act as the window in a certified enclosure for use in a hazardous area (e.g. ATEX)

The tertiary sight glass or fibre feed-through are designed and tested to the same (or higher) pressure rating as the sight glass assembly. In general terms, optical components may be installed in the secondary containment vessel and may include lenses, filters, mirrors, prisms or other components to modify the light or light path. These optical elements, and the sight glasses, could be provided with optical coatings that reduce reflections or filter certain wavelengths. Various measures, as described above, are taken to reduce the likelihood of damage to these components in the event of a sight glass failure.

In some embodiments the camera may be replaced by a spectrometer (e.g. absorption or Raman). In other embodiments a simple meter for measuring the level of light returning from inside the pipe may be provided. In most cases it is necessary to inject light into the vessel, chamber or pipe, and to sense the level, wavelength, pattern or other optical characteristic of light returning from the inside of the vessel, chamber or pipe. A laser may be used to illuminate the inside of the vessel, chamber or pipe, either illuminating a point, line, grid or any other pattern within the pipe. The laser light may be carried to the secondary (or primary, if no secondary sight glass is present) sight glass by an optic fibre.

In its simplest form the secondary containment vessel would allow illumination and a camera to report the activity in a high pressure pipeline or vessel through a single sight glass. Other embodiments would utilise multiple sight glasses for illumination, cameras, detection and analysis systems. This system improves safety when using sight glasses with high pressure systems. In the event of a sight glass failing, the pressure is contained by a number of elements and pressure may be isolated from the sight glass assembly.

The core features of the system are a secondary sight glass with a liquid or gel, or minimal gap, between the primary and secondary glasses, a secondary containment vessel and reflective element which allows sight glasses to be out of direct line with the primary sight glass and a valve to automatically isolate the pressure system upon a sight glass failure. All of these features, individually and synergistically, contribute to the safe containment of high pressure fluids in the event of a sight glass failure.

FIG. 7 shows a secondary containment vessel 16 within a flange 100 which is mounted via a spur pipe to the gas pipeline 10 at a tapping point 18. The secondary containment vessel, contained within the flange 100, contains optics, and in some cases an imaging device, which are able to view the interior of the gas pipeline 10 through an opening in the gas pipeline 10 provided by the spur pipe 18.

FIG. 8 illustrates the secondary containment assembly 16 located within the flange 100. Here, a plurality of pressure retaining windows 101 form sight glasses which provide a window or aperture into the high pressure pipeline. This plurality of pressure retaining windows 101, along with the seal between the flange and the camera enclosure 99, form the primary seal between the pressurised gas pipeline and the atmosphere. LED, fibre optic or other light sources 102 may be used to illuminate the high pressure pipeline through the peripheral pressure retaining windows 101, with the interior of the high pressure pipeline imaged via a camera 103 and a central pressure retaining window 101. A plurality of lenses 104 may be used to focus light returning into the secondary containment vessel 16 as required.

The operation of the camera 103 may be controlled by a PCB 105, potentially including a pressure sensor, mounted within the secondary containment vessel 16. Additionally, the camera may receive information, and export images via a high pressure electrical connector 106. Such a high pressure electrical connector 106 may form a secondary seal between the high pressure gas pipeline and the atmosphere. As such, it is important to protect the high pressure electrical connector 106 from debris should the primary seal fail. In this embodiment of the invention, this protection is provided by a shield 107.

In this embodiment of the invention, oxygen and moisture levels are also decreased in the secondary containment assembly 16 with the use of desiccants and oxygen eaters 108. The secondary containment assembly 16 is affixed to the high pressure pipeline via boltholes 109 in the flange 100.

FIG. 9 further depicts the insertion of the secondary containment apparatus 16 into the high pressure pipeline 110. In this embodiment of the invention, further illumination and imaging is provided via an additional connector assembly 111. Here, a lens 112, a mirror 113, a fibre connector (secondary seal) 114 and additional camera and/or light source 115 is used to provide imaging of the high pressure pipeline beyond that undertaken in the secondary containment apparatus 16.

FIG. 10 depicts an embodiment of the invention wherein the secondary containment apparatus 16 is mounted as part of a Tee piece assembly 120. In this embodiment, the flange 100, in which the secondary containment apparatus 16 is contained, is mounted to the Tee piece assembly 120 via a plurality of nut and bolt clamps 121. In such an embodiment, the high pressure pipeline may be illuminated via fibre optic assemblies 122 and the use of a mirror 123.

FIG. 11 depicts an embodiment of the invention where the secondary containment apparatus 16 is protected by a series of valves. In such an embodiment, a pressure sensor on the PCB 105 may be used to detect an increase in pressure in the secondary containment apparatus 16. The detection of an increase in pressure may trigger the emergency closure of valves to prevent, or reduce, damage to components in the secondary containment vessel 16. Additionally, the closure of the emergency valves may prevent the second seal from failure and the released of material from the high pressure pipeline into the atmosphere. In the embodiment presented in FIG. 11, the secondary containment vessel 16 may be isolated form the high pressure pipeline in an emergency by a flap valve 130, ball valve 131 and double block and bleed valve 132.

The invention claimed is:

1. A sight glass apparatus for viewing the interior of a pressurized vessel, chamber or a pipe conveying fluid under pressure, the sight glass apparatus comprising:
    a sight glass assembly mounted over an opening into the vessel, chamber or pipe, the sight glass assembly comprising a sight glass adjacent the opening which provides a window to the inside of the pressurized vessel, chamber or pipe;
    a containment vessel mounted at least one of behind or around the sight glass assembly for containing fluid exiting the opening in the pressurized vessel, chamber or pipe in the event that the sight glass assembly fails, wherein, during normal operation, the pressure within the containment vessel is configured to be higher than atmospheric pressure; and
    an optical sensor mounted within the containment vessel for viewing the interior of the pressurized vessel, chamber, or pipe through the sight glass assembly.

2. The sight glass apparatus according to claim 1, wherein the optical sensor is a camera.

3. The sight glass apparatus according to claim 1, where the optical sensor is a spectrometer.

4. The sight glass assembly according to claim 1, wherein the optical sensor is a power meter or any device capable of characterizing the nature of light returning from the inside of the pressurized vessel, chamber or pipe through the sight glass.

5. The sight glass apparatus according to claim 1, wherein at least a portion of inside walls of the containment vessel are provided with an impact absorbent lining to absorb debris in the event of the sight glass assembly failing.

6. The sight glass apparatus according to claim 1, further comprising a debris retaining element mounted around the sight glass assembly to inhibit debris from falling into the pressurized vessel, chamber or pipe.

7. The sight glass apparatus according to claim 1, wherein the primary containment vessel is located within a flange mounted over an opening into the pressurized vessel, chamber or pipe.

8. The sight glass apparatus according to claim 1, further comprising a desiccant.

9. The sight glass apparatus according to claim 1, further comprising an oxygen absorber.

10. The sight glass apparatus according to claim 1, wherein the containment vessel comprises a primary containment vessel, further comprising a secondary pressure containment vessel mounted behind or around the sight glass assembly.

11. The sight glass apparatus according to claim 1, wherein the sight glass in the sight glass assembly is provided with an optical coating.

12. The sight glass apparatus according to claim 1, wherein the containment vessel comprises one or more optical elements for defining an indirect optical path between the sight glass and the optical sensor, the optical sensor being mounted out of a direct path from the sight glass.

13. The sight glass assembly according to claim 12, wherein the one or more optical elements comprise one or more lenses, mirrors and/or other optical elements to focus or modify the light path within the containment vessel.

14. The sight glass apparatus according to claim 1, further comprising an impact resistant element interposed between the sight glass and an optical element, camera, further sight glass, or feed-through provided within or in a wall of the containment vessel.

15. The sight glass apparatus according to claim 14, wherein the impact resistant element is a transparent or non-transparent plate oriented at an angle with respect to the plane of the sight glass.

16. The sight glass apparatus according to claim 1, wherein the containment vessel comprises a bursting disk mounted in a wall of the primary containment vessel.

17. The sight glass apparatus according to claim 16, wherein an outlet of the bursting disk is connected to a pressure relief system for safe removal of gas in the event of a sight glass failure.

18. The sight glass apparatus according to claim 16, wherein the pressurized vessel, chamber or pipe contains combustible gas.

19. The sight glass apparatus according to claim 16, wherein the pressurized vessel, chamber or pipe contains a natural gas.

20. The sight glass assembly according to claim 16, further comprising a vent between the inside of the pressurized vessel, chamber or pipe to outside of the pressurized vessel, chamber or pipe and the sight glass assembly, for purging gas from the inside of the pressurized vessel, chamber or pipe.

21. The sight glass apparatus according to claim 1, wherein the sight glass assembly comprises a plurality of sight glasses adjacent to the opening into the pressurized vessel, chamber or pipe which provides the window to the inside of the pressurized vessel, chamber or pipe.

22. The sight glass apparatus according to claim 21, wherein the pressurized vessel, chamber or pipe is illuminated through at least one sight glass of the plurality of sight glasses, and the pressurized vessel, chamber or pipe is observed with an optical sensor through at least one other sight glass of the plurality of sight glasses.

23. The sight glass apparatus according to claim 22, wherein the pressurized vessel, chamber or pipe is illuminated through at least one peripheral sight glass, and the pressurized vessel, chamber or pipe is observed with an optical sensor through a central sight glass.

24. The sight glass apparatus according to claim 1, further comprising a valve assembly mounted inside the pressurized vessel, chamber or pipe, the valve assembly being responsive to the failure of the sight glass assembly to close off the opening.

25. The sight glass apparatus according to claim 24, wherein the valve assembly comprises a flap valve which under normal conditions is in an open position, and which is urged into a closed position by the flow of fluid from the pressurized vessel, chamber or pipe through the sight glass assembly in the event that the sight glass assembly fails.

26. The sight glass apparatus according to claim 25, wherein the flap valve is retained in the closed position by a pressure differential between the two sides of the flap valve.

27. The sight glass apparatus according to claim 24, further comprising a pressure sensor.

28. The sight glass apparatus according to claim 27, wherein the valve assembly is responsive to the pressure sensor.

29. The sight glass apparatus according to claim 28, wherein the valve assembly comprises a flap valve.

30. The sight glass apparatus according to claim 28, wherein the valve assembly comprises a ball valve.

31. The sight glass apparatus according to claim 28, wherein the valve assembly comprises a double block and bleed valve.

32. The sight glass apparatus according to claim 1, wherein the sight glass is a first sight glass, and wherein the sight glass apparatus further comprises a second sight glass mounted behind and spaced away from the first sight glass, the first and second sight glasses providing the window to the inside of the pressurized vessel, chamber or pipe.

33. The sight glass apparatus according to claim 32, wherein a space between the first sight glass and the second sight glass contains a transparent liquid, gel or other transparent medium.

34. The sight glass apparatus according to claim 32, wherein the first sight glass and the second sight glass are spaced apart by between 0.5 mm and 10 mm.

35. The sight glass apparatus according to claim 32, wherein the first sight glass and the second sight glass are spaced apart by between 0.5 mm and 5 mm.

36. The sight glass apparatus according to claim 32, wherein the first sight glass and the second sight glass are spaced apart by between 0.5 mm and 2 mm.

37. The sight glass apparatus according to claim 32, wherein the first sight glass and the second sight glass are spaced apart by between 1 mm and 2 mm.

38. The sight glass apparatus according to claim 32, wherein one or both of the first and second sight glass is mounted at an angle to one or more of (a) the plane of the sight glass mounts, (b) a plane perpendicular to a the longitudinal axis of a spur pipe upon which the sight glass apparatus is mounted, and (c) an optical viewing axis from an optical sensor mounted behind the second sight glass into the apparatus.

* * * * *